United States Patent [19]
Kawamoto et al.

[11] 4,080,625
[45] Mar. 21, 1978

[54] PICKUP CIRCUITRY FOR A VIDEO DISC PLAYER WITH PRINTED CIRCUIT BOARD

[75] Inventors: Hirohisa Kawamoto, Kendall Park; Edgar Jacob Denlinger, East Windsor, both of N.J.

[73] Assignee: RCA Corporation, New York, N.Y.

[21] Appl. No.: 743,144

[22] Filed: Nov. 18, 1976

[30] Foreign Application Priority Data

Nov. 21, 1975 United Kingdom .............. 48030/75

[51] Int. Cl.² ........................ H04N 5/76; G11B 21/00
[52] U.S. Cl. .............................. 358/128; 179/100.1 B; 179/100.4 M; 179/100.41 G
[58] Field of Search ................. 358/128; 179/100.4 R, 179/100.4 M, 100.1 B, 100.41 G

[56] References Cited

U.S. PATENT DOCUMENTS

| | | | |
|---|---|---|---|
| 3,418,435 | 12/1968 | Norris | 179/100.4 M |
| 3,806,668 | 4/1974 | Hilliker | 179/100.4 M |
| 3,872,240 | 3/1975 | Carlson et al. | 179/100.1 B |
| 3,872,265 | 3/1975 | Hilliker | 179/100.4 M |
| 4,030,123 | 6/1977 | Taylor et al. | 358/128 |
| 4,030,124 | 6/1977 | Allen | 358/128 |
| 4,038,682 | 7/1977 | Allen | 358/128 |

*Primary Examiner*—Raymond F. Cardillo, Jr.
*Attorney, Agent, or Firm*—Eugene M. Whitacre; William H. Meagher

[57] ABSTRACT

Stylus, having a conductive electrode, is mounted at one end of a pivoted stylus support arm within a pickup cartridge body of non-conductive material, removably received in a conductive housing. A conductive spring, with one end in electrical contact with the stylus electrode, is secured at its opposite end to the cartridge body. A printed circuit board, mounted within the conductive housing, comprises a dielectric substrate bearing a conductive coating in several elongated surface regions. The conductive coating in two of said regions defines first and second conductors, lying substantially parallel to each other. When the cartridge is received in the housing, electrical contact is established between the body-secured spring end and one end of the first conductor. Capacitive elements couple the other end of the first conductor to the housing. The spring, first conductor, and housing form a transmission line, which resonates with the end-loading capacitive elements and a variable capacitance formed between stylus electrode and the disc record, at frequencies in a selected range. UHF oscillations at a frequency adjacent said range are inductively coupled to the transmission line. AM detector, connected to second conductor, recovers recorded information.

13 Claims, 3 Drawing Figures

PICKUP CIRCUITRY FOR A VIDEO DISC PLAYER WITH PRINTED CIRCUIT BOARD

The present invention relates generally to pickup circuitry for a disc record player, and particularly to pickup circuitry of an advantageous form suitable for use in a video disc player of the type generally described in U.S. Pat. No. 3,842,194 — Clemens.

In a player of the type described in the Clemens patent, a groove tracking stylus supports an electrode which forms a capacitance with a conductive coating on the disc record. The disc-stylus capacitance is subject to variation as geometrical variations in the groove bottom, representative of the recorded information, pass beneath the stylus.

An illustrative system for converting the information-responsive capacitance variations to electrical signals is described in U.S. Pat. No. 3,872,240 — Carlson, et al. In the Carlson, et al. arrangement, a pivoted support arm for the stylus is formed of conductive material and electrically connected to the stylus; the conductive arm forms a transmission line with a surrounding arm housing of conductive material. The transmission line is capacity end loaded at the arm end remote from the stylus by a series combination of capacitances which include an air dielectric capacitor and a voltage variable capacitor. The transmission line and associated capacitances form a tuned circuit with a resonant frequency subject to variation as the stylus-disc capacitance varies. The tuned circuit is excited with UHF oscillations from a fixed frequency oscillator, operating at a frequency (e.g., 915 MHz.), preferably within a band allocated to ISM (industrial, scientific, medical) uses, which is shifted slightly from the center of the variation range for the resonant frequency of the tuned circuit. As the resonant frequency of the tuned circuit varies, the resultant UHF oscillation amplitude variations are detected to recover the recorded information.

While the above-described system of the Carlson, et al. patent provides a satisfactory signal recovery apparatus, the electrical parameters imposed upon the stylus support arm lead to dimensional and weight requirements therefor which can limit the arm's performance of its mechanical functions. Additionally, such a system has been found to be difficult to adjust for optimum performance in a repeatable manner suitable for use in mass production of players.

In the present invention, the transmission line associated with the stylus-disc capacitance in establishing a resonant circuit is independent of the stylus support arm, and is formed using accurately controllable printed circuit techniques. The stylus electrode is connected to a conductor formed with controlled dimensions on a printed circuit board, enclosed within the conductive arm housing, and forming a transmission line therewith. The transmission line is end loaded by capacitive means, coupled to the end of the conductor remote from the stylus connection, and illustratively including a varactor diode for tuning control purposes (of the type discussed in the aforesaid Carlson, et al patent).

Illustratively, the stylus support arm, freed of its electrical functions, is arranged as described in the U.S. patent application of A. K. Dholakia, Ser. No. 667,307 filed on Mar. 16, 1976. The connection between the stylus electrode and the printed circuit board is effected with the use of a conductive spring secured to the stylus (such as is described in the aforesaid A. K. Dholakia application). The effective transmission line length is determined by the combined lengths of the spring and the printed circuit conductor.

An input circuit supplying UHF oscillations of a desired frequency (preferably in an ISM band location) is inductively coupled to the transmission line. An output circuit, comprising an amplitude modulation detector, is also inductively coupled to the transmission line by means of a second conductor, lying substantially parallel to the transmission line conductor and formed with controlled dimensions and spacing on the same board using printed circuit techniques.

Preferably, the second conductor is relatively closely spaced with respect to the transmission line conductor so as to provide relatively tight coupling between the output circuit and the transmission line, whereas relatively loose coupling between the input circuit and the transmission line is provided via a third conductor relatively remotely spaced with respect to the transmission line conductor. The third conductor may be formed with controlled dimensions and (fixed) spacing on the board using printed circuit techniques, or, alternatively, may be a portion of a wire loop mounted on the board and adjustable in its spacing (for amplitude control of the coupled oscillations).

With the aforementioned coupling relationship, a desired shape of the resonance curve of the tuned circuit (formed by the transmission line with the stylus-record capacitance, et al.) can be established by suitable selection of the second conductor's length and its spacing from the transmission line conductor. The input circuit illustratively derives its UHF oscillations by inductive coupling to the tank circuit of a UHF oscillator located in the arm housing; desirably, the coupling to the oscillator tank circuit is loose so as to only lightly load the oscillator (permitting operation with a high Q for the tank circuit, and consequent avoidance of spurious frequency modulation of the oscillator output).

Figure 1:
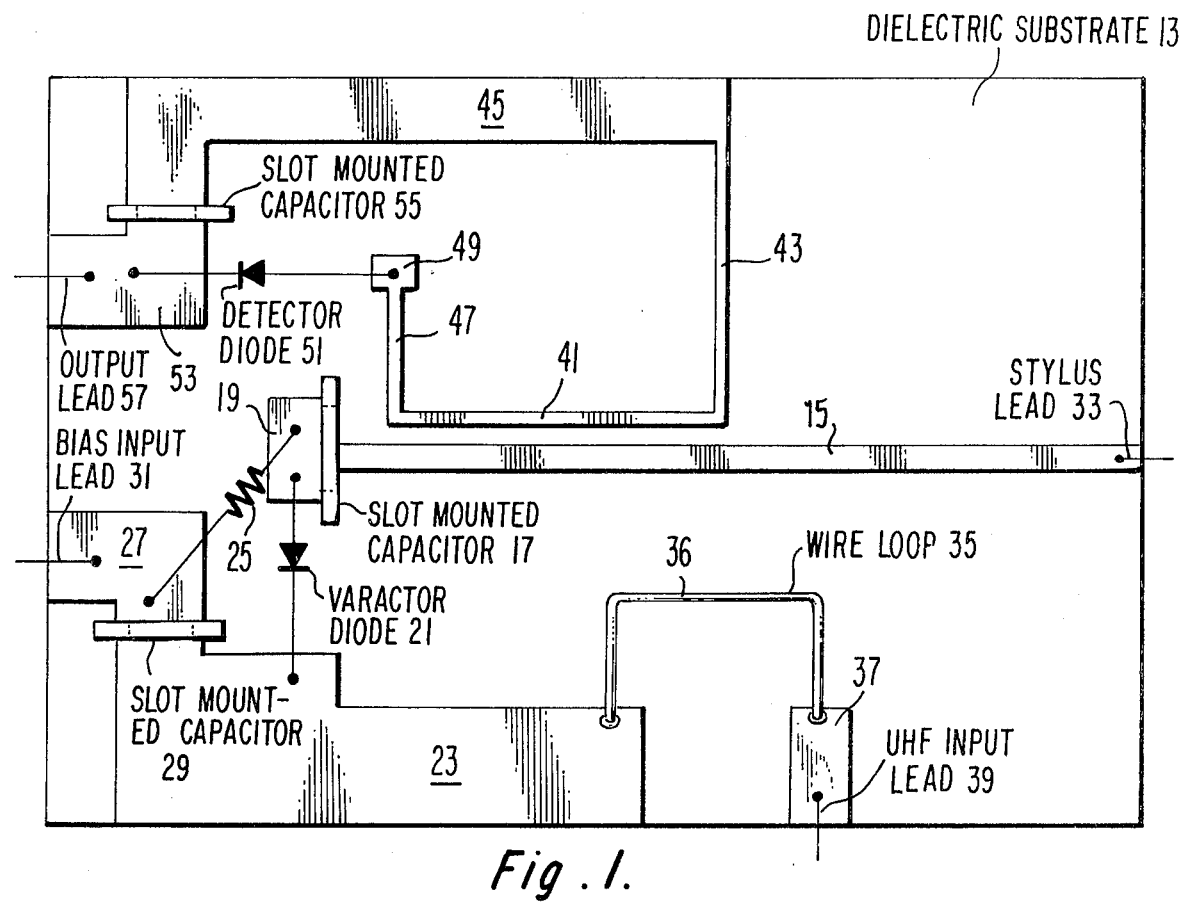
FIG. 1 illustrates a printed circuit board (in plan view) and associated circuit components, providing an arrangement for pickup circuitry in accordance with an embodiment of the present invention.

In FIG. 1, a plan view is shown of a printed circuit board, comprising a flat substrate 13 of dielectric material, bearing a conductive coating only in selected regions (15, 19, 23, 27, 37, 41, 43, 45, 47, 49 and 53) of one major surface thereof. Illustratively, the printed circuit board is constituted by a copper clad substrate 13 formed of glass filled teflon (e.g., Fluorglas E600/1-C7, supplied by Atlantic Laminates), with photolithographic techniques employed to establish the dimensions, outlines, locations and spacings of the surface regions in which the copper coating of the substrate is retained.

A first conductor 15 is formed by the conductive coating of an elongated surface region of substrate 13. Electrical coupling between one end of conductor 15 and a connection pad 19 is provided by a capacitor 17 (illustratively of a trapezoidal form, mounted on the printed circuit board by insertion in a slot in the substrate 13 located between the conductor end and the coated surface region forming the connection pad 19).

On opposite sides of the first conductor 15, conductive coatings on respective peripheral regions of the surface of substrate 13 form respective ground pads 23 and 45. A varactor diode 21 is connected between the connection pad 19 and the ground pad 23, while a resistor 25 is connected between the connection pad 19 and a bias input pad 27, formed by a coated surface region close to one end of the ground pad 23. A capacitor 29 (e.g., of the form of capacitor 17) is mounted in a slot formed in substrate 13 between adjacent portions of pads 23 and 27. Illustratively, diode 21 and resistor 25 (schematically represented in FIG. 1) are mounted on the undersurface of substrate 13, with leads inserted in locating holes extending through substrate 13.

A second conductor 41, spaced from and substantially parallel to the first conductor 15, is formed by the conductive coating of an elongated surface region, lying relatively close to the region covered by conductor 15 but shorter than the latter. Additional elongated regions of the substrate surface disposed orthogonally relative to conductor 41 are coated to form respective conductors 43 and 47, the former connecting one end of the second conductor 41 to the ground pad 45, and the latter connecting the other end of conductor 41 to a connection pad 49.

A detector diode 51 is connected between the coated surface region forming the connection pad 49 and an output pad 53 formed by the coating of a surface region near one end of ground pad 45. A capacitor 55 (e.g., of the form of capacitor 17) is mounted in a slot in the substrate 13 located between adjacent portions of the pads 45 and 53. Illustratively, diode 51 is subject to undersurface mounting in the manner described for components 21, 25.

A third conductor 36, lying substantially parallel to the first conductor 15, is disposed on the opposite side of conductor 15 from the location of conductor 41 and is spaced more remotely from conductor 15 than is conductor 41. As illustrated in FIG. 1, the third conductor 36 comprises a central portion of a loop 35 of conductive wire. The end legs of loop 35, disposed at right angles to conductor 36 are anchored to the printed circuit board in a manner to permit pivoting of the loop toward or away from the surface of substrate 13 (to permit adjustment of the spacing between conductors 36 and 15). One end leg termination is connected to ground pad 23, while the other end leg termination is connected to a UHF input pad 37 formed by the conductive coating on a peripheral region of substrate 13.

In use of the apparatus of FIG. 1 in pickup circuitry for a disc record player, the substrate 13 is mounted in a housing of conductive material. Illustratively, such a housing may be constituted by an arm housing of the general type described in the aforementioned Carlson, et al. patent, providing a supporting enclosure for a pivoted stylus-carrying pickup arm, which enclosure moves in a radial direction during playback to maintain the arm in an attitude substantially tangential to the record groove segment subject to playback. However, in a pickup system embodying the principles of the present invention, the pivoted pickup arm is freed of the electrical (transmission line forming) functions served by it in pickup systems described in said Carlson, et al. patent (and in U.S. Pat. No. 3,872,265 — Hilliker, referenced in said Carlson, et al. patent). Rather, the pickup circuitry is formed with substantial independence of the pivoted pickup arm (as is also characteristic of pickup systems described, for example, in the aforementioned Clemens patent, in a prior art description portion of the aforementioned Hilliker patent, and in U.S. Pat. No. 3,806,668 — Hilliker referenced in the aforementioned Hilliker patent).

When the substrate 13 is mounted in the housing, provision is made for connecting the peripheral ground pads 23 and 45 to conductive surfaces of the housing (e.g., by solder connections to adjacent housing wall surfaces), while ensuring isolation of the peripheral output and input pads therefrom (e.g., by aperturing housing wall surfaces in regions adjoining these pads). A stylus lead 33 provides an electrical connection between the end of conductor 15 remote from capacitor 17 and the electrode of a playback stylus (e.g., of the type described in the aforesaid Clemens patent). The conductor 15, and the effective extension thereof provided by stylus lead 33, form with the conductive enclosure a transmission line.

The transmission line is capacity end loaded at each end: (a) at one end, by the series combination of the slot mounted capacitor 17 and the capacitance exhibited by varactor diode 21; and (b) at the other end, by the varying stylus-record capacitance exhibited between the stylus electrode and the record's conductive coating as groove bottom geometry variations pass beneath the stylus (the varying stylus-record capacitance appearing in series with a relatively large capacitance exhibited between the record's conductive coating and the undersurface of the conductive arm housing which closely overshadows the record, as described in the aforementioned U.S. Pat. No. 3,872,265).

A tuned circuit, formed by the transmission line and the end loading capacitance has a resonant frequency which is subject to variation over a range of frequencies in response to the stylus-record capacitance variations. By variation of a reverse bias voltage applied across the varactor diode 21, a vernier adjustment of the location of the aforesaid tuning range may be provided. For this purpose, a bias input lead 31 links the bias input pad 27 to a suitable variable bias source. Desirably, the variable bias source is formed by an automatic tuning circuit of the type described, for example, in the aforementioned Carlson, et al. patent, whereby tuning range location is automatically adjusted to ensure adequate signal recovery.

In pickup use of the FIG. 1 apparatus, a UHF input lead 39 links the UHF input pad 37 to a source of UHF oscillations, desirably of a frequency (e.g., 915 MHz, in United States use) within an ISM band, as explained in the aforementioned Carlson, et al. patent, so as to energize loop 35. The UHF oscillations are coupled to the tuned circuit via inductive coupling between conductors 36 and 15. The location of the tuning range center (e.g., 910 MHz) is slightly shifted from the UHF source frequency, so that the source frequency falls on a slope (e.g., upper slope) of the resonance curve, and effectively moves up and down said slope as the stylus-record capacitance varies.

Conductor 41, due to its relatively tight inductive coupling to the transmission line conductor 15, is energized with UHF oscillations of an amplitude which varies significantly with the slope position of the source frequency. That is, as the stylus-record capacitance varies, the resonant frequency of the tuned circuit moves toward and away from the source frequency, altering the tuned circuit response to the source oscillations and thus varying the amplitude of the oscillations coupled to conductor 41. The envelope of the amplitude modulated UHF oscillations coupled to conductor 41 is detected by operation of the detector diode 51 (linked to conductor 41, via connection pad 49 and conductor 47), with the slot mounted capacitor 55 serving as the detector filter capacitor 55. The detector output is coupled to suitable circuitry for processing the recorded information, via an output lead 57 linking the output pad 53 to the processing circuitry input. Reference may be made, for example, to U.S. Pat. No. 3,969,756 — Clemens, et al., for description of an illustrative encoding format for the recorded information, and for a general description of suitable processing circuitry therefor.

Figure 2:
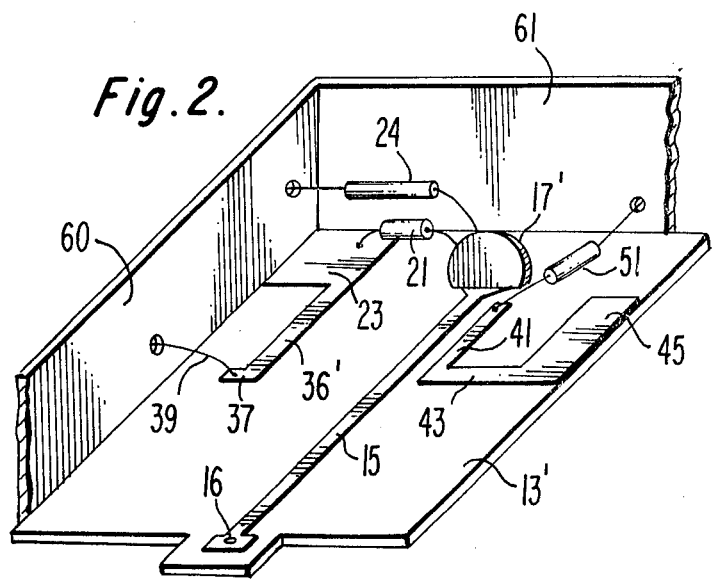
FIG. 2 illustrates, in perspective view, a modification of the apparatus of FIG. 1 in accordance with a further embodiment of the present invention.

In FIG. 2, a modification of the FIG. 1 apparatus is shown, which is illustrative of a further embodiment of the present invention. The FIG. 2 illustration provides a perspective view of a printed circuit board structure, as mounted within a compartment of a conductive housing, with housing walls partially broken away to aid in viewing the board and associated components.

The printed circuit board of FIG. 2 comprises a flat substrate 13' of dielectric material bearing a conductive coating only in selected surface regions (15, 23, 36', 37, 41, 43 and 45) of one major surface thereof. The substrate 13' is illustratively formed of material of the type described for substrate 13 of FIG. 1, but its shape departs from the rectangular shape of the FIG. 1 substrate, by virtue of incorporating a central projection from one rectangle end.

The retained conductive pattern on the surface of substrate 13' defines and elongated first conductor 15 and a shorter second conductor 41, lying substantially parallel to the first conductor, as in the board arrangement of FIG. 1. One end of conductor 15 terminates at a slot in the substrate 13' which receives a capacitor 17' (here shown in disk form). The opposite end of conductor 15 terminates on the aforementioned central projection of substrate 13', and bears a terminal 16 (illustratively, in the form of a rivet embedded in the substrate 13').

One end of the second conductor 41 is connected by a conductor 43, disposed at right angles to conductor 41, to a peripherally located ground pad 45, as in the FIG. 1 apparatus. Also, as in the FIG. 1 apparatus, the coating on a peripheral region of the substrate surface, disposed on the opposite side of conductor 15 from the coated peripheral region forming ground pad 45, forms a second ground pad 23.

As in the FIG. 1 apparatus, varactor diode 21 is electrically connected in series with a capacitor (17') between one end of conductor 15 and a ground pad. The mounting of diode 21 is, however, above the coated surface of substrate 13' in the FIG. 2 arrangement, with one diode lead soldered directly to the plate of capacitor 17' remote from the conductor 15 end, and the other diode lead soldered to the ground pad 23. Bias application to diode 21 is also effected via an above-board mounted component, which is illustratively a choke coil 24, with one coil lead soldered directly to the aforesaid remote plate of capacitor 17', and with the other coil lead connected to a variable bias source (not shown) via an aperture in a compartment wall 60 of the conductive arm housing in which the printed circuit board is mounted. Illustratively, the wall aperture traversal by the lead of coil 24 is effected via passage through a feed-through capacitor (not illustrated) mounted in the wall aperture (and serving the bias voltage filtering function provided by capacitor 29 in the FIG. 1 apparatus).

Also mounted above the coated surface of substrate 13' is detector diode 51, with one diode lead soldered to the end of conductor 41 remote from conductor 43, and the other diode lead extending through an aperture in the housing compartment wall 61 to the input of signal processing circuitry (not shown). Illustratively, the traversal of the housing wall aperture by the diode lead is effected by lead passage through a feed-through capacitor (not illustrated) mounted in the wall aperture (and serving the detector filter capacitor function performed by capacitor 55 in the FIG. 1 apparatus).

A UHF input lead 39, passing through an additional opening in the housing compartment, links a source of UHF oscillations (not shown) with a connection pad 37 formed by the conductive coating of a substrate surface region on the same side of conductor 15 as ground pad 23. An elongated surface region extending between pads 23 and 37 also bears a conductive coating forming a third conductor 36', lying substantially parallel to the first conductor 15, but with a spacing therefrom appreciably greater than the spacing between the second conductor 41 and the opposite side of conductor 15.

Figure 3:
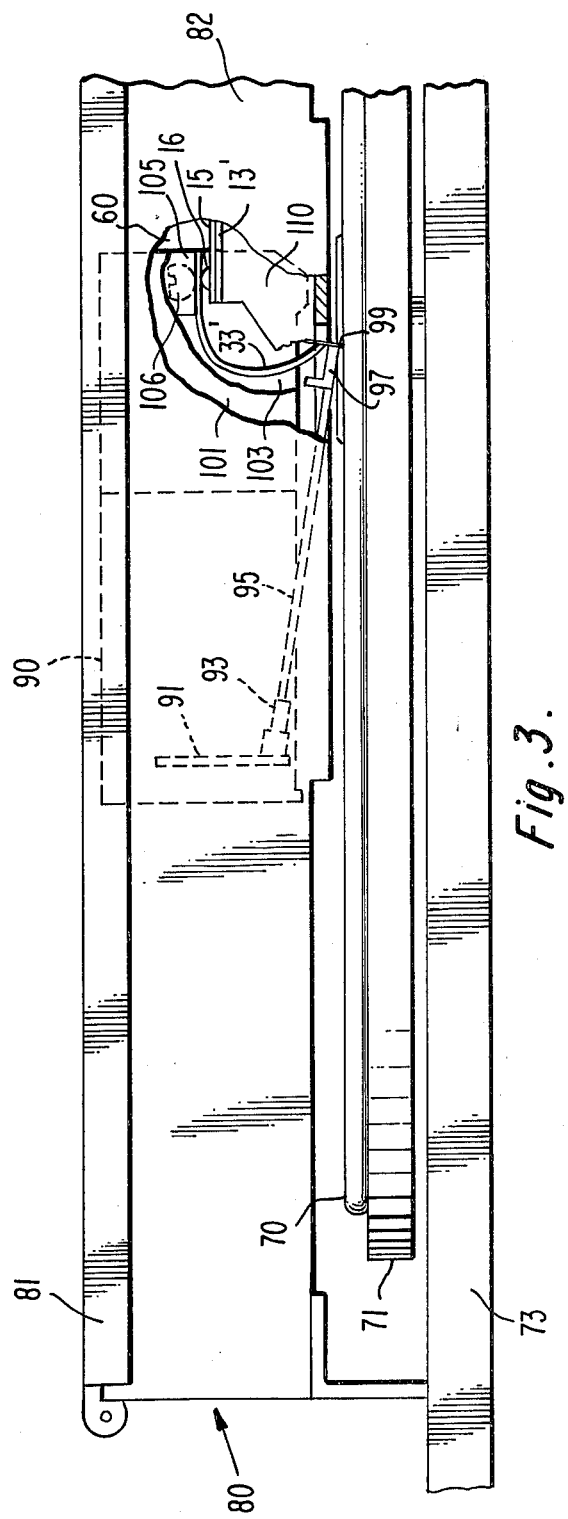
FIG. 3 provides a view of video disc player apparatus, partially broken away to illustrate incorporation of the FIG. 2 apparatus pursuant to principles of the present invention.

In FIG. 3, a segment of a video disc player (suitable for playback of video disc records of the general type described in the aforementioned U.S. Pat. No. 3,842,194 — Clemens) is shown in a side view, with portions broken away to reveal the disposition of the printed circuit board of FIG. 2 and associated pickup circuit components during playback operations.

In the illustrated player apparatus, a turntable 71 is rotatably mounted on a motor board 73. A record 70 of the aforesaid Clemens type is supported by the turntable 71 and subject to rotation therewith during playback operations. A conductive arm housing 80 is mounted for translatory motion over the rotating record 70 during playback. A hinged cover 81 permits access to the interior of the housing 80, which includes a compartment in which a pickup cartridge 90 is removably received.

Illustratively, the pickup cartridge 90 is of the type described in the copending U.S. Pat. Application, Ser. No. 667,420, of James Allen, now U.S. Patent No. 4,030,124. The pickup cartridge 90 comprises an elongated body of nonconductive material, with a narrowed forward portion having a pair of parallel side walls 101, 103. A compliant coupler 93, secured to one end of a pickup arm 95, is affixed to a mounting plate 91 suspended with the rear portion of the cartridge body. A stylus holder 97, secured to the opposite end of the pickup arm 95, supports a stylus 99. The stylus 99 is of the general type described in the aforementioned Clemens patent, and comprises a supporting body of insulating material bearing an electrode of conductive material.

Reference may be made to the aforesaid Allen application for a description of suitable means for suspending plate 91 within the cartridge 90 and for descriptions of housing mounted apparatus (not illustrated) which may be desirably associated with the cartridge 90 for establishing the illustrated attitudes of plate 91, coupler 93 and pickup arm 95. In the illustrated attitude of pickup arm 95, the arm protrudes through registered openings in the bottom of cartridge 90 and housing 80 in a manner permitting reception of the tip of stylus 99 in the groove of the rotating record 70.

Portions of the housing sidewall 82 and of the cartridge's forward side wall 101 are broken away in FIG. 3 to permit an unobstructed side view of stylus 99, holder 97, and the adjoining end of arm 95, as well as an unobstructed side view of a bowed leaf spring 33', formed of flat, conductive material. The spring 33' is secured at one end to the stylus 99 in a manner establishing electrical contact between the spring 33' and the stylus electrode. The opposite end of spring 33' is secured to a flat on a ball 106. The ball 106 is friction loaded into a socket (provided in a front ledge 105 of the cartridge body) so that the flat slightly protrudes from the socket. This form of mounting for the spring end, which provides a facility for vernier adjustment of arm centering in the cartridge, and of stylus tracking pressure, is the subject of the copending U.S. Pat. Application, Ser. No. 667,396, of B. K. Taylor, et al., now U.S. Pat. No. 4,030,123. After ball positioning for such adjustment purposes during cartridge assembly, desirably the ball is firmly glued in place.

The central end projection of substrate 13' (of the FIG. 2 apparatus) is supported on an upper surface of a mounting block 110 (of non-conductive material). The mounting block 110 is positioned in housing 80 so that, when the cartridge 90 is received in its operating position in housing 80, the central end projection of substrate 13 is received in a recess between the forward side walls 101, 103 of the cartridge, with terminal 16 at the end of conductor 15 (shown with exaggerated thickness) positioned in registry with the ball-secured end of spring 33'. Illustratively (as shown, for example, in the aforesaid Allen application), a cover-mounted spring (not illustrated here) cooperates with the body of cartridge 90, when housing cover 81 is closed, to exert downward pressure on the forward portion of cartridge 90 to ensure good electrical contact between the spring end and terminal 16.

As signal-representative geometric variations in the bottom of the groove of record 70 pass beneath stylus 99, they cause variations in the capacitance exhibited between the stylus electrode and a conductive coating on the record 70. The variable stylus-record capacitance (provided with a low impedance return to the housing 80 by a relatively large capacitance exhibited between the record's conductive coating and the bottom of the overlying housing 80) loads one end of a transmission line formed by the serially connected spring 33' and printed circuit conductor 15 with the enclosing housing 80. The opposite end of the transmission line is loaded by the series combination of capacitor 17' and varactor diode 21.

The signal pickup operation is similar to that described for the FIG. 1 apparatus. The stylus-record capacitance variations cause variations in the tuning of a resonant circuit formed by the transmission line and its end loading capacitances. UHF oscillations, applied to conductor 36' via input lead 39, are coupled to the tuned circuit via input lead 39, are coupled to the tuned circuit via inductive coupling between the printed circuit conductors 36' and 15. The location of the tuning variation range is centered (e.g., by the bias applied to varactor diode 21) at a frequency slightly shifted from the UHF source frequency, so that the source frequency falls on a slope of the resonance curve of the tuned circuit, and effectively moves up and down said slope as the stylus-record capacitance varies. Conductor 41, with relatively tight inductive coupling to the transmission line conductor 15, is energized with UHF oscillations of an amplitude which varies signifcantly with the slope position of the source frequency. Such amplitude modulation of the UHF oscillations is detected by the operation of detector diode 51 to recover the recorded signal information.

With use of printed circuit techniques to form a transmission line conductor as a conductive coating of accurately controlled dimensions on a dielectric substrate, and with appropriately referenced mounting of the substrate within the conductive housing, a transmission line may be realized with characteristics which are highly desirable for the pickup circuitry purposes of the present invention; viz.: (a) compact dimension; (b) high characteristic impedance, which enhances the ability of the very small stylus-record capacitance variations to produce significant resonant frequency variations; (c) a form amenable to mass production, with repeatability of characteristics relatively independent of assembler skill.

The printed circuit form of the transmission line conductor, moreover, facilitates its use in conjunction with a cartridge mounted stylus, where it is desired that cartridge removal and reinsertion can be simply effected by the player user, without need for unwiring and wiring steps. In such use, a particularly advantageous combination is realized when the printed circuit board structure is associated with a stylus lead of the spring form shown in FIG. 3. With appropriate control of the dimensions of the conductive ribbon used for spring 33', and of the dimensions of the associated cartridge body and components, repeatable characteristics for the overall transmission line configuration are readily realized, essentially free from lead dress variation problems.

With the illustrated dispositions of the respective coupled conductors (15, 36, 41 in FIG. 1; 15, 36', 41 in FIG. 2, and with the indicated dress of the board mounted components, the shape of the resonance curve of the transmission line tuned circuit is primarily controlled by the relative dimensions and attitudes of the relatively tightly coupled conductors 15 and 41, and the spacing therebetween. With the invention's use of printed circuit techniques to establish such dimensions, attitudes, and spacing, these parameters are subject to accurate control, ensuring repeatable attainment of desired curve shape under mass production conditions.

For a substantially symmetrical resonance curve shape, the length of conductor 41 should be relatively short (e.g., less than one-tenth of the effective transmission line length, inclusive of the stylus lead length). However, departure from a symmetrical shape may be desired to provide an optimum compromise between sensitivity and aperture response requirements of the pickup system. In general, an increase in the steepness of the slope (upon which the source frequency falls) enhances sensitivity, whereas a decrease in the steepness of the slope enhances aperture response. With suitable increases in the length of conductor 41 relative to the length of conductor 15, and/or reductions in the spacing therebetween, the slope on the high frequency side of the resonance curve can be increased relative to that on the low frequency side. An illustrative choice of parameters, found to be satisfactory for operation with a 200 ohm characteristic impedance line, a 915 MHz. source frequency and a 910 MHz. tuning range center frequency, provided a resonance curve with a Q of 60, and a slight asymmetry providing a steeper slope on the high frequency side of the resonance curve.

With the illustrated dimensioning providing relatively loose coupling between the transmission line and the UHF input coupler (adjustably spaced conductor 36 in FIG. 1; fixedly spaced conductor 36' in FIG. 2), the resonance curve shape is relatively independent of any variations in loading on the coupler, or adjustments of the coupler spacing (FIG. 1). Desirably, the UHF input coupling circuit is also loosely coupled to the tank circuit of oscillation source (not illustrated) to avoid significant loading of such tank circuit, whereby a high Q may be maintained for the tank circuit, with attendant source frequency stability advantages. Where oscillation amplitude adjustment is desired, when using the fixed spacing input coupler of FIG. 2, the facility may be provided through use of variable spacing of the coupling to the source tank circuit.

It may be noted that in the invention embodiments of FIGS. 1 and 2, the mounting of the detector diode 51 is away from the vicinity of conductor 15. This lessens the likelihood of significant coupling between the transmission line and the diode leads, avoiding the introduction of spurious resonances in the tuned circuit response, as well as unpredictable variations in such spurious resonances (that might otherwise accompany diode lead length or dress variations). Avoidance of spurious resonances and unpredictable variations thereof is also aided by the use of the lead-free slot mounted capacitors, and through the use of printed circuit techniques which permit accurate control of the locations of not only the printed conductors, but also locating slots and lead anchoring holes for the associated components, whereby short lead lengths and readily repeatable lead dress may be obtained.

What is claimed is:

1. In a disc record playback system including a stylus having a conductive electrode for establishing a variable capacitance with a disc record during playback, the combination comprising:
   a stylus support arm providing at one end thereof support for said stylus;
   a conductive housing for said arm having an aperture through which said one end of said support arm extends during disc playback;
   means for pivotally supporting the other end of said stylus support arm within said housing;
   a printed circuit board assembly mounted within said housing, said printed circuit board assembly comprising: a dielectric substrate; a first conductor formed by a conductive coating on a first elongated region of a surface of said substrate; a second conductor lying in a spaced, substantially parallel relationship to said first conductor and formed by a conductive coating on a second elongated region of said substrate surface; and a third conductor lying in a spaced, substantially parallel relationship to said first conductor;
   conductive means for connecting said stylus electrode to one end of said first conductor;
   capacitive means for electrically coupling the remaining end of said first conductor to said conductive housing;
   a source of ultra high frequency oscillations mounted within said housing and coupled to said third conductor; and
   amplitude modulation detecting means mounted within said housing and coupled to said second conductor.

2. Apparatus in accordance with claim 1 wherein the spacing between said third conductor and said first conductor is large relative to the spacing between said second conductor and said first conductor.

3. Apparatus in accordance with claim 2 wherein said third conductor is formed by a portion of a wire loop supported by said substrate and subject to positioning adjustment to vary the spacing between said third conductor and said first conductor.

4. Apparatus in accordance with claim 2 wherein said third conductor is formed by a conductive coating on a third elongated region of said substrate surface.

5. Apparatus in accordance with claim 4 wherein a slot is provided in said substrate adjacent to said remaining end of said first conductor, wherein a fourth region of said substrate surface is provided with a conductive coating connected to said conductive housing, and wherein said capacitive means comprises:
   a capacitor mounted in said slot and having a pair of terminals, one of said pair of terminals being connected to said remaining end of said first conductor; and
   a voltage variable capacitance connected between the other of said pair of terminals and said conductive coating on said fourth region.

6. Apparatus in accordance with claim 5 wherein said conductive means for connecting said stylus to said one end of said first conductor comprises a bowed spring of flat, conductive material.

7. Apparatus in accordance with claim 6 wherein said spring and said first conductor form, with said conductive housing, a transmission line of an effective length such that the resonant frequency of a tuned circuit including said variable stylus-record capacitance, said transmission line, said capacitor and said voltage variable capacitance is subject to variation, in response to variations of said stylus-record capacitance, over a frequency range in the immediate vicinity of the frequency of oscillations provided by said source.

8. Apparatus in accordance with claim 7 also including:
   means responsive to the output of said detecting means for developing a control voltage indicative of undesired variations in the resonant frequency of said tuned circuit; and
   means connected between said control voltage developing means and said other of said pair of capacitor terminals for applying said control voltage to said voltage variable capacitance to vary the capacitance exhibited thereby in a sense tending to oppose said undesired resonant frequency variations.

9. In a disc record playback system including a stylus having a conductive electrode for establishing a variable capacitance with a disc record during playback, the combination comprising:
   a stylus support arm providing at one end thereof support for said stylus;
   a conductive housing for said arm having an aperture through which said one end of said support arm extends during disc playback;
   means for pivotally supporting the other end of said stylus support arm within said housing;
   a printed circuit board mounted within said housing, said printed circuit board comprising: a dielectric substrate; a first conductor formed by a conductive coating on a first elongated region of a surface of said substrate; a second conductor lying in a spaced, substantially parallel relationship to said first conductor and formed by a conductive coating on a second elongated region of said substrate surface relatively close to said first region; and a third conductor lying in a spaced, substantially parallel relationship to said first conductor and formed by a conductive coating on a third elongated region relatively remote from said first region;

conductive means for connecting said stylus electrode to one end of said first conductor;

capacitive means for electrically coupling the remaining end of said first conductor to said conductive housing;

a source of ultra high frequency oscillations mounted within said housing and coupled to said third conductor; and amplitude modulation detecting means mounted within said housing and coupled to said second conductor.

10. In a disc record playback system, the combination comprising:
(1) a pickup cartridge comprising:
  (a) a cartridge body of nonconductive material;
  (b) a stylus support arm pivotally supported at one end within said cartridge body;
  (c) a stylus having a conductive electrode and supported by said stylus support arm at an arm end remote from said one end;
  (d) a spring formed of flat conductive material, and having a first end secured to said cartridge body and a second end secured to said stylus in a manner electrically connecting said spring to said stylus electrode;
(2) a conductive housing for receiving said pickup cartridge in a housing region having a bottom aperture through which said remote end of said stylus support arm extends during disc record playback;
(3) a printed circuit board comprising: a dielectric substrate; a first conductor formed by a conductive coating on a first elongated region of a surface of said substrate; a second conductor lying in a spaced, substantially parallel relationship to said first conductor and formed by a conductive coating on a second elongated region of said substrate surface; and a terminal secured to one end of said first conductor;
(4) means for supporting said printed circuit board within said housing in a location positioned with respect to said housing region so that electrical contact is established between said terminal and said second end of said spring when said cartridge is received in said housing region, whereby a transmission line is formed by said spring, said first conductor and said conductive housing with an effective length determined by the combined lengths of said spring and said first conductor;
(5) means, coupled between the remaining end of said first conductor and said conductive housing, for capacity end loading said transmission line;
(6) means, mounted within said housing and including a third conductor lying in a spaced, substantially parallel relationship to said first conductor, for inductively coupling ultra high frequency oscillations to said transmission line; and
(7) amplitude modulation detecting means mounted within said housing and coupled to said second conductor.

11. Apparatus in accordance with claim 10 wherein said third conductor is formed by a conductive coating on a third elongated region of said substrate surface, said third surface region being separated from said first surface region by a spacing significantly greater than the spacing between said second surface region and said first surface region.

12. Apparatus in accordance with claim 11 wherein said capacity end loading means includes a fixed capacitor and a varactor diode connected in series between said remaining end of said first conductor and said conductive housing; and wherein said apparatus also includes a source of variable biasing voltage, and means for applying said variable biasing voltage to the junction of said series-connected capacitor and diode.

13. Apparatus in accordance with claim 12 wherein variations in a capacitance exhibited between said stylus electrode and a disc record during disc record playback alter the tuning of a resonant circuit formed by said stylus-record capacitance, said transmission line, said capacitor, and said diode over a range of frequencies; and wherein the lengths of said spring and first conductor are such as to establish an effective transmission line length which locates said range of frequencies in the immediate vicinity of the frequency of said ultra high frequency oscillations.

* * * * *